United States Patent [19]

Sutphin et al.

[11] Patent Number: 4,763,339
[45] Date of Patent: Aug. 9, 1988

[54] DIGITAL WORD SYNCHRONIZING ARRANGEMENT

[75] Inventors: Melvin W. Sutphin, Goode; Theodore E. Taylor, Lynchburg, both of Va.

[73] Assignee: General Electric Company, Lynchburg, Va.

[21] Appl. No.: 903,485

[22] Filed: Sep. 4, 1986

Related U.S. Application Data

[63] Continuation of Ser. No. 589,716, Mar. 15, 1984, abandoned.

[51] Int. Cl.$^4$ .............................................. H04L 7/00
[52] U.S. Cl. ..................................... 375/114; 370/106; 375/113
[58] Field of Search ............... 375/100, 106, 113, 114; 370/100, 106; 371/42, 46, 69

[56] References Cited

U.S. PATENT DOCUMENTS

| | | | |
|---|---|---|---|
| 3,591,720 | 7/1961 | Othmer | 375/114 |
| 3,622,886 | 9/1968 | Rabow | 375/114 |
| 3,836,722 | 9/1974 | Muller et al. | 370/106 |
| 4,001,693 | 1/1977 | Stackhouse et al. | 375/114 |
| 4,022,973 | 5/1977 | Stackhouse et al. | 375/114 |
| 4,027,243 | 5/1977 | Stackhouse et al. | 375/114 |
| 4,110,558 | 8/1978 | Kageyama et al. | 375/109 |
| 4,128,809 | 12/1978 | Kage | 375/100 |
| 4,245,212 | 1/1981 | Cirimele | 371/69 |
| 4,276,642 | 6/1981 | Siglow et al. | 370/106 |
| 4,298,984 | 11/1981 | Baker | 375/100 |
| 4,306,308 | 12/1981 | Nossen | 375/113 |
| 4,312,074 | 1/1982 | Pautler et al. | 375/114 |
| 4,353,130 | 10/1982 | Carasso et al. | 375/114 |
| 4,400,811 | 8/1983 | Brown et al. | 371/69 |
| 4,606,029 | 8/1986 | Nagao et al. | 371/6 |

FOREIGN PATENT DOCUMENTS 2068687 12/1981 United Kingdom .
2086106 6/1982 United Kingdom .

Primary Examiner—Robert L. Griffin
Assistant Examiner—Stephen Chin
Attorney, Agent, or Firm—Nixon & Vanderhye

[57] ABSTRACT

Word synchronization of a digital message comprised of spaced predetermined synchronizing words is indicated by a first initial detection of a synchronizing word followed by detection of two synchronizing words out of the next four synchronizing words.

20 Claims, 3 Drawing Sheets

DIGITAL WORD SYNCHRONIZING ARRANGEMENT

This is a continuation of application Ser. No. 589,716, filed Mar. 15, 1984, now abandoned.

BACKGROUND OF THE INVENTION

Our invention relates to a digital word synchronizing arrangement. In particular, our invention relates to an arrangement or a method for achieving synchronization with digital synchronizing words provided at selected intervals in a digital message.

Sequences of digital signals are frequently used to transmit data, because such sequences can be transmitted rapidly and efficiently. However, such rapid transmission requires equally rapid and efficient synchronization of the data receiver with the words forming the information of the transmitted data message. Without such synchronization, the beginning and end of each information word is unknown, resulting in meaningless data. The synchronization problem is increased if the transmission medium is noisy or subject to fading, as it frequently is if the medium is a radio channel. For these and other reasons, predetermined synchronizing words are provided sequentially at spaced locations or times in a data message to provide a data receiver with the opportunity to recognize the synchronizing words and synchronize itself so as to accurately detect where the information parts or words of the data message begin and end.

SUMMARY OF THE INVENTION

Briefly and in accordance with our invention, we compare the received digital signals in a message with a stored predetermined digital synchronizing word. Upon the initial correct comparison indicating a correctly received synchronizing word, we compare the next four subsequently received synchronizing words with the stored predetermined synchronizing word. If any two of these four subsequent comparisons indicates a correctly received synchronizing word, we produce an in-synchronization signal to indicate that word synchronization has been achieved, and to indicate that information words can then be accurately read and utilized. However, if less than two of these four subsequent comparisons indicate a correctly received synchronizing word, we resume comparison of the subsequent digital signals until another initial correct synchronizing word is indicated. We then compare the next four synchronizing words, and if any two are correct, we produce an in-synchronization signal. If less than two are correct, we start again. This process is repeated as often as needed, or until no more synchronizing words are received.

BRIEF DESCRIPTION OF THE DRAWING

The subject matter which we regard as our invention is particularly pointed out and distinctly claimed in the claims. The structure and operation of our invention, as well as advantages, may be better understood from the following description given in connection with the accompanying drawing, in which:

DESCRIPTION OF OUR ARRANGEMENT

Figure 1:
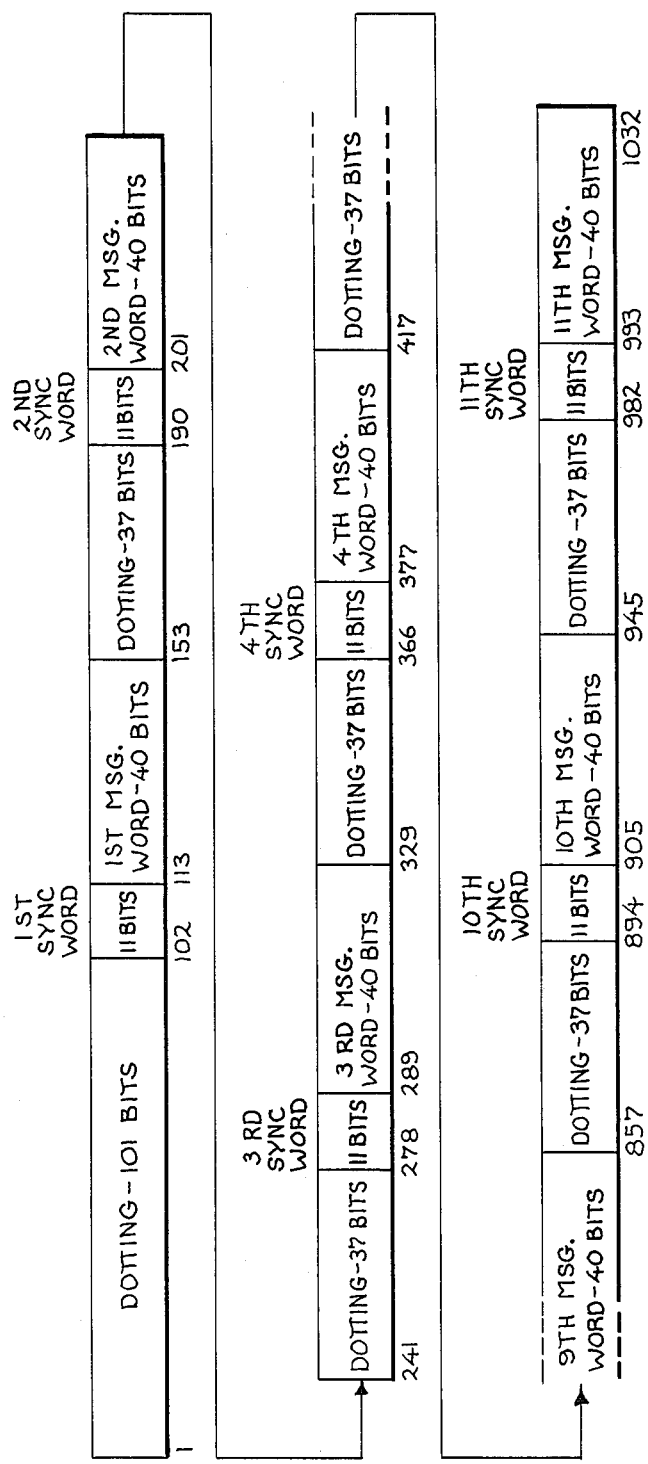
FIG. 1 shows a diagram illustrating a digital message for which our synchronizing arrangement is intended to be used.

While persons of ordinary skill in the art will, after reading this description, appreciate that our invention can be used with various formats of data messages having various synchronizing words, we have selected the sequential data format of FIG. 1 to explain the operation of our invention. This data format is intended to be used to transmit a data message in cellular radio telephone systems. And while we describe our invention with binary types of data, persons skilled in the art will appreciate that our arrangement can be used with other types of data, such as ternary signals. The data format comprises a total of 1032 bits, and the bit number that starts each part of the format is indicated. The format of FIG. 1 starts with 101 dotting bits, which typically are alternate 1's and 0's to achieve bit synchronization. Next, starting with bit 102, the first synchronizing word of 11 bits is transmitted. In the cellular data message standard mentioned, this synchronizing word is comprised as follows: 11100010010. While other synchronizing words can be used, the indicated format is desirable in that it has a relatively small chance of being repeated in a message word. Following the first synchronizing word, a first message word of 40 bits starting with bit 113 is transmitted. These bits have binary values that convey the desired message. Next, starting with bit 153, 37 dotting bits are transmitted. These are followed by the second synchronizing word which is identical to the first synchronizing word. The second synchronizing word is followed by a second message word, which typically is the same as the first message word. This sequence is repeated to provide a total of 11 sequences comprised of dotting bits, a synchronizing word, and a message word. And, the synchronizing words are typically equally spaced by 77 bits: 40 bits of a message word plus 37 synchronizing bits. However, such equal spacing or time interval is not essential.

One of the reasons that this format was selected was that it typically enables a radio receiver to achieve bit synchronization and word synchronization in a relatively short time and with reasonable accuracy. This accuracy is improved if a word synchronizing arrangement in accordance with our invention is utilized.

Figure 2:
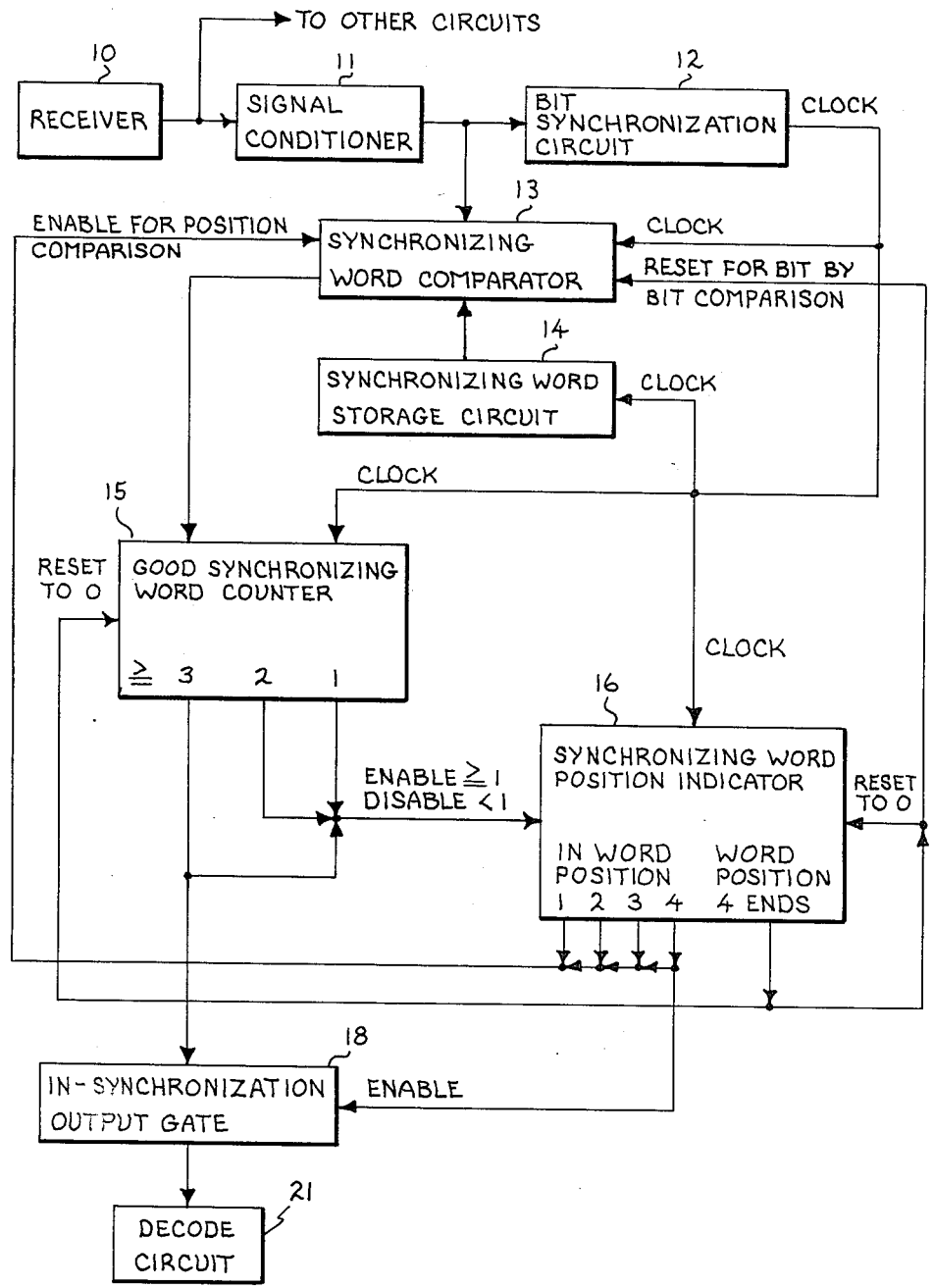
FIG. 2 shows a block diagram illustrating our synchronizing arrangement.

FIG. 2 shows a block diagram that illustrates our synchronizing arrangement. While a typical preferred embodiment of our invention would more likely be achieved by means of a microprocessor and associated memory circuits, we have provided the block diagram of FIG. 2 in order to facilitate the understanding of our arrangement.

As shown, our arrangement includes a receiver 10 which receives and processes incoming signals from either a wire or radio medium, and if necessary, demodulates these signals. If these signals include speech or other information, they can be applied to appropriate circuits. The data signals are applied to a signal conditioner 11 which, if the data is in the form of modulated signals, converts these signals to digital signals having the appropriate or desired voltage levels. These digital signals are applied to a bit synchronization circuit 12 which, as known in the art, produces a clock signal of the appropriate frequency that is synchronized with the incoming bit signals. The clock signal is applied to various portions of our arrangement as needed. The bit signals are applied to a synchronizing word comparator or comparison circuit 13 which compares the incoming bit signals with a stored synchronizing word having the desired or predetermined bit sequence in a storage circuit 14. This comparison may be either in series or in parallel. Each time a correct sequence of synchronizing word bits (such as the 11100010010 mentioned) is found from this comparison, the comparator 13 produces an output signal that is applied to a good synchronizing word counter 15. When reset, the comparator 13 operates in a bit by bit mode to look at each new bit to determine if that new bit plus the prior (ten) bits form the correct synchronizing word. After an initial detection of a correct synchronizing word, the comparator 13 operates in a position mode and only looks at the 11 (or appropriate number of) bits which occur at the time or position of the next synchronizing word.

The counter 15 has appropriate outputs that respectively indicate a count of 1 good word, or a count of 2 good words, or a count of 3 or more good words as shown. Each time a count of 1, or a count of 2, or a count of 3 is reached, an enable signal is applied to a synchronizing word position indicator 16. If the count of counter 15 is less than 1, the indicator 16 is disabled.

The position indicator 16 is arranged to count clock bits from the circuit 12 so that when the indicator 16 is enabled by the initial detection of a synchronizing word, it can count the number of bits to indicate the time position or location of the next expected synchronizing word. After being enabled by an initial detection of a synchronizing word, the indicator 16 produces an output 1, 2, 3 or 4 respectively for the time or position in which succeeding synchronizing words 1, 2, 3 or 4 should appear. Thus, with reference to FIG. 1 again, if the first synchronizing word (bits 102 through 112) is correctly detected, the position indicator 16 can then count the number of bits to indicate the position of the second synchronizing word. This count would be the first message word of 40 bits plus the next 37 dotting bits, so that at the appearance of bit 190 of the second synchronizing word, the indicator 16 provides an output signal at output 1 to indicate that the first synchronizing word, after a detection of the initial synchronizing word, is in position. An output signal is provided at outputs 2, 3 and 4 to indicate the time or position of the second, third and fourth synchronizing words respectively after the initial detection of a synchronizing word. Of course, the initial detection may occur at any location in the message shown in FIG. 1. Each of the outputs 1, 2, 3 and 4 are applied to the synchronizing word comparator 13 to cause the comparator 13 to operate in the position mode and look for a synchronizing word at the proper time or position.

When the word position indicator 16 produces an output 4, this indicates that four synchronizing word positions have occurred since the initial correctly detected synchronizing word. This 4 output is applied to an enable input of an in-synchronization output gate 18.

This 4 output from the indicator 16 is applied to open or enable an in-synchronization output gate 18. If the good word counter 15 has reached a count of 3 or more, its 3 output is passed by the enabled gate 18 to indicate that word synchronization has been achieved by detection of a first correct synchronizing word, and by detection of two additional synchronizing words during the next four synchronizing word positions. When passed by the gate 18, this in-synchronization signal can be utilized by a decode circuit 21 to indicate to the receiver 10 or other circuits that word synchronization has been achieved, and hence the message words of FIG. 1 can be accurately and correctly decoded or utilized.

The position indicator 16 is also provided with an output to indicate the end of the position of synchronizing word 4. This output is applied to reset the word comparator 13 for bit by bit comparison, and to reset the word counter 15 and the position indicator 16 to zero. Upon this reset, the arrangement starts looking for an initial synchronizing word again, whether an in-synchronization output was produced or was not produced.

Figure 3:
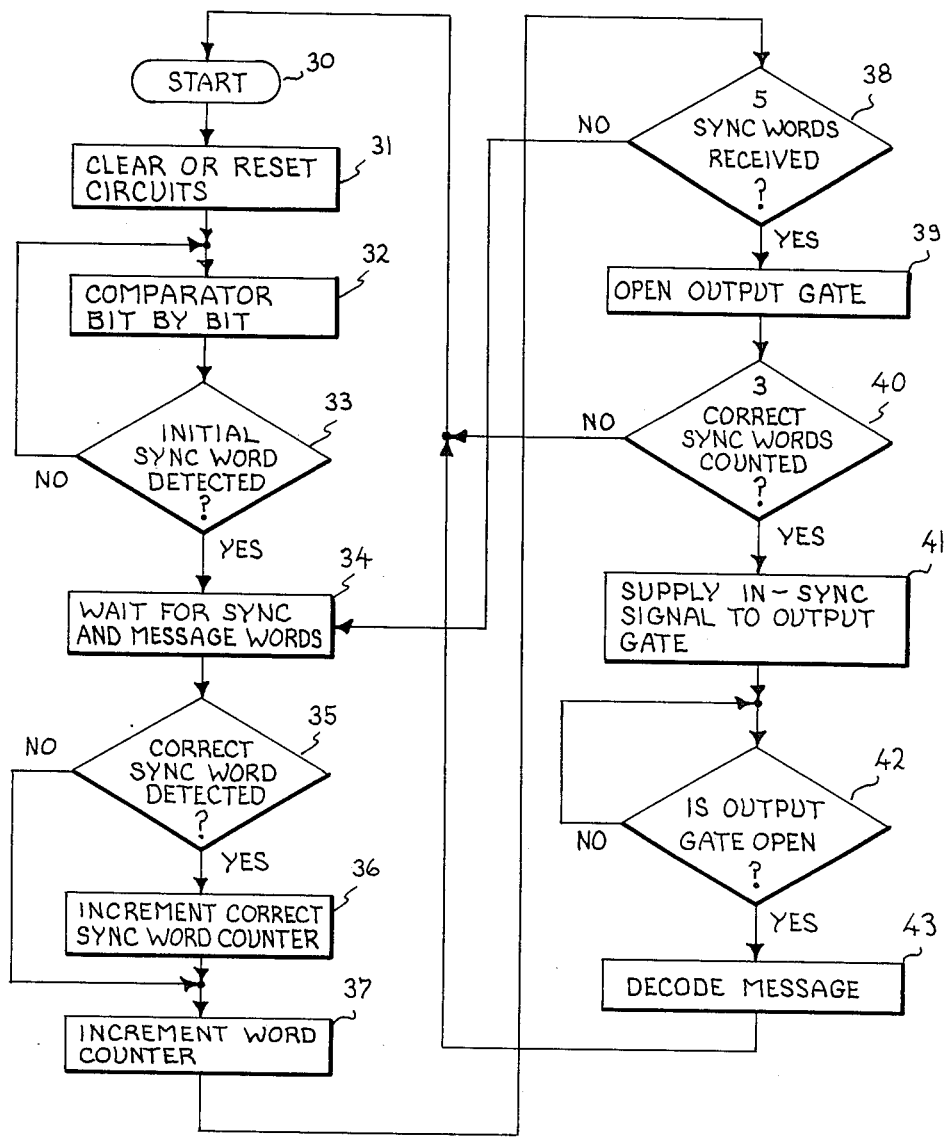
FIG. 3 shows a flow chart or diagram illustrating the operation of our arrangement of FIG. 2.

FIG. 3 shows a flow chart or diagram illustrating the operation of the arrangement of FIG. 2, and also illustrating the operation that would be performed by a microprocessor and appropriate memory circuits to achieve the same function as that provided by the arrangement of FIG. 2. With respect to FIG. 3, a start function is initiated by a start circuit 30 to clear or reset the various circuits as indicated by the block 31. This permits the sequential digital bits to be shifted into the word comparator as indicated by the block 32.

Bits continue to be shifted into the word comparator as long as no initial synchronizing (sync in FIG. 3) word is detected as indicated by the decision block 33. However, once an initial synchronizing word is detected, the circuit waits for additional synchronizing and message words as indicated by the block 34. Each time a subsequent synchronizing word position occurs, the decision block 35 determines whether a correct synchronizing word is present or detected. If the determination is no, a word counter 37 is incremented. If the determination is yes, a correct synchronizing word counter 36 is incremented, which in turn increments the word counter 37. Thus the word counter 37 is incremented each time a correct or incorrect synchronizing word appears or is detected.

The count output of the block 37 is applied to a decision block 38 which determines when five synchronizing words (including the initial synchronizing word) have been received. As long as less than five synchronizing words (including correct and incorrect) have been received, the decision block 38 keeps the block 34 waiting for synchronizing and message words. When five synchronizing words (including correct and incorrect) have been received, a block 39 opens the output gate 18. A decision block 40 determines whether three of these five words are correct. If not, the arrangement is restarted to look for an initial synchronizing word on a bit by bit comparison. If three words are correct, an in-synchronization signal is sent by the block 41 to the output gate 18 of FIG. 2. If the decision block 42 indicates the gate 18 is open, the in-synchronization signal is applied to a block 43 to decode the message words. After this decoding, the circuit is restarted to look for another message.

SUMMARY

It will thus be seen that we have provided an improved word synchronizing circuit which operates to provide word synchronization in response to a first good synchronizing word detection, followed by two additional good synchronizing word detections during the next four synchronizing word positions. And while we contemplate that the synchronizing words are equally spaced in time, this may not be necessary in some applications. With our synchronizing arrangement operating with the data message of FIG. 1, we have found that with a bit error rate of 0.05, our synchronizing arrangement produces a correct in-synchronization output signal for 69.2% of the time, and with an error or false indication of an in-synchronization condition only once every 39.8 hours.

While the arrangement shown in the FIGURES and described is our preferred embodiment, persons skilled in the art will appreciate that modifications may be made. Therefore, while our invention has been described with reference to a particular embodiment, it is to be understood that modifications, particularly in terms of circuit implementation, may be made without departing from the spirit of the invention or from the scope of the claims.

What we claim as new and desire to secure by Letters Patent of the United States is:

1. An improved arrangement for achieving synchronization with a data message comprising a synchronizing word transmitted a plurality of times during said message in a communication system in which said data message is not analyzed until after achieving said synchronization, comprising:
   a. input means for receiving said transmitted synchronizing words;
   b. means for storing a predetermined synchronizing word;
   c. means coupled to said input means and to said storing means for comparing each received synchronizing word with said stored synchronizing word, and producing a first signal in response to each received synchronizing word that corresponds to said stored synchronizing word; and
   d. in-synchronization signal generating means coupled to said comparing means for producing an in-sychronization signal in response to one of said first signals followed by the production of at least two more of said first signals during any sequence of any of the next four comparisons of said received synchronizing words with said stored predetermined synchronizing word even when a first signal is not produced during each of two consecutive comparisons, whereby data message analysis is initiated in response to said in-synchronization signal.

2. The improved arrangement of claim 1 wherein said transmitted synchronizing words are spaced at uniform intervals during said message, and wherein said comparing means makes said next four comparisons at said uniform intervals.

3. The improved arrangement of claim 1 wherein said transmitted synchronizing words are spaced at predetermined intervals during said message, and wherein said comparing means makes said next four comparisons at said predetermined intervals.

4. For use in a communication system having at least a transmitter at a first location and a receiver at a second location for receiving digital messages including digital data from said transmitter, said digital data being analyzed in response to said receiver achieving synchronization with said digital messages, synchronizing apparatus comprising:
   a. means coupled to said receiver for deriving digital messages therefrom, each derived digital message having a plurality of synchronizing words occurring at locations therein which are spaced at predetermined intervals;
   b. means coupled to said deriving means for producing a synchronizing signal in response to each derived synchronizing word having a predetermined sequence of digital values;
   c. counting means coupled to said deriving means for counting said synchronizing word locations, and coupled to said producing means for counting said synchronizing signals; and
   d. in-synchronization signal generating means coupled to said counting means for producing an in-synchronization output signal in response to at least two synchronizing signals during any sequence of any of the next four counted synchronizing word locations following the production of the first synchronizing signal during a digital message even when a synchronizing word is not detected at each of two consecutive synchronizing word locations, whereby data message analysis is initiated in response to said generated output in-synchronization signal.

5. The synchronizing apparatus of claim 4 wherein said digital message has a plurality of identical synchronizing words occurring at locations therein which are spaced at predetermined equal intervals.

6. An improved method for detecting a digital synchronizing word comprised of a sequence of digital signals having a predetermined characteristic and appearing at a plurality of spaced predetermined times in a received digital message in a communication system where data in said digital message is analyzed after achieving synchronization with said received digital message, said method comprising the steps of:
   a. storing a predetermined digital word prior to receiving said digital message;
   b. comparing said sequence of digital signals with said stored predetermined digital word and producing a first detected word signal in response to the first sequence of digital signals in a message being the same as said stored predetermined digital word;
   c. comparing said sequence of digital signals with said stored digital word at said predetermined times subsequent to said first detected word signal being produced, and producing a second detected word signal in response to each sequence of digital signals at subsequent predetermined times being the same as said stored digital word;
   d. counting said second detected word signals subsequent to said first detected word signal; and
   e. producing an in-synchronization signal in response to a production of at least two detected word signals during any sequence of any of said next four subsequent predetermined times even when a detected word signal is not produced during each of two consecutive comparisons, whereby data message analysis is initiated in response to said generated in-synchronization signal.

7. The improved method of claim 6 and, in the absence of at least two detected word signals during said next four subsequent predetermined times, comparing said sequence of digital signals with said stored digital word until said first detected word signal is produced.

8. The improved method of claim 6 and, in the absence of two second detected word signals during said four subsequent predetermined times, further comprising the step of resetting the count of detected word signals to zero, and comparing said sequence of digital signals with said stored digital word until said first detected word signal is produced.

9. An improved arrangement for achieving synchronization with a data message comprising serial bits forming a synchronizing word transmitted a plurality of times during said message in a communication system where data is not analyzed until after achieving said synchronization, comprising:
- a. input means for receiving said transmitted synchronizing words;
- b. means for storing a predetermined synchronizing word;
- c. means coupled to said input means and to said storing means for comparing received serial bits with said stored synchronizing word, and producing an initial signal in response to an initial comparison in which a series of bits correspond to said stored synchronizing word, and producing a good word signal in response to each subsequent comparison in which each series of bits correspond to said stored synchronizing word; and
- d. in-synchronization signal generating means coupled to said comparing means for producing an in-synchronization signal in response to at least two of said good word signals during any sequence of any of the next four subsequent comparison of said groups of subsequent series of bits with said stored synchronizing word even when a good word signal is not produced during each of two consecutive comparisons, whereby data analysis is initiated in response to said generated in-synchronization signal.

10. The improved arrangement of claim 9 wherein said initial comparison is made each time a new bit is received.

11. The improved arrangement of claim 9 wherein each of said subsequent comparisons is made in response to a synchronizing word position indication.

12. The improved arrangement of claim 10 wherein each of said subsequent comparisons is made in response to a synchronizing word position indication.

13. The improved arrangement of claim 9 and comprising means to restart said initial comparison following said next four comparisons of said groups.

14. The improved arrangement of claim 10 and comprising means to restart said initial comparison following said next four comparisons of said groups.

15. The improved arrangement of claim 11 and comprising means to restart said initial comparison following said next four comparisons of said groups.

16. The improved arrangement of claim 12 and comprising means to restart said initial comparison following said next four comparisons of said groups.

17. An improved method for detecting a digital synchronizing word comprised of a sequence of digital signals having a predetermined characteristic and appearing at a plurality of spaced predetermined times in a digital data message is a communication system in which data in said digital message in not analyzed until after achieving synchronization with said message, said method comprising the steps of:
- a. initially comparing said sequence of digital signals each time a new signal occurs in said sequence with a stored digital word and producing an initial signal in response to the first sequence of digital signals in a message being the same as said stored digital word;
- b. subsequently comparing said sequence of digital signals on a time position basis with said stored digital word at said predetermined times subsequent to said initial signal being produced, and producing a second signal in response to each sequence of digital signals at subsequent predetermined times being the same as said stored digital word;
- c. counting said second signals subsequent to said initial signal;
- d. producing an in-synchronization signal in response to production of at least two of said second signals during any sequence of any of said next four subsequent predetermined times even when a second signal is not produced during each of two consecutive subsequent predetermined times; and
- e. starting said initial comparison following said four predetermined times, whereby data analysis is initiated in response to said generated in-synchronization signal.

18. A method for reliably establishing word framing or synchronization in a digital communication system where a predetermined synchronization word is repeated at known time-spaced intervals during a digital data message transmission in a communication system in which data is not analyzed until after establishing said word framing, said method comprising the steps of:
establishing tentative word framing by first detecting an occurrence of said synchronization word;
attempting to detect the expected presence of said synchronization word at a plurality of the next succeeding of said known time-spaced intervals based on said established tentative word framing; and
determining whether at least any two of the next four expected synchronization words are successfully detected and establishing the existence of a reliable confirmed word framing condition after said first detected occurrence if at least any two of the next four expected synchronization words are successfully detected even when an expected synchronization word is not detected at each of two consecutive space time intervals, whereby data analysis is initiated in response to establish the existence of said reliable word framing.

19. A method for generating as reliable word synchronization signal in a received string of digital signals including data and expected to include a predetermined synchronization word in each of predetermined sync-word time slots, said method comprising the steps of:
searching for the first detectable occurrence of said synchronization word in said received string of digital signals and establishing tentative word frame timing based thereon;
generating said word synchronization signal if any two or more of the four next expected synchronization words are successfully detected using said tentative word frame timing even when an expected synchronization word is not detected during each of two consecutive sync-word time slots; and
returning to said searching step if less than any two of said four next expected synchronization words are successfully detected using said tentative word frame timing, whereby data analysis is first initiated upon generating said word synchronization signal.

20. A method as in claim 19 wherein said searching step includes the step of establishing bit synchronization.

* * * * *